Sept. 24, 1935.  C. A. CAMPBELL  2,015,214
AIR BRAKE
Filed Oct. 8, 1931
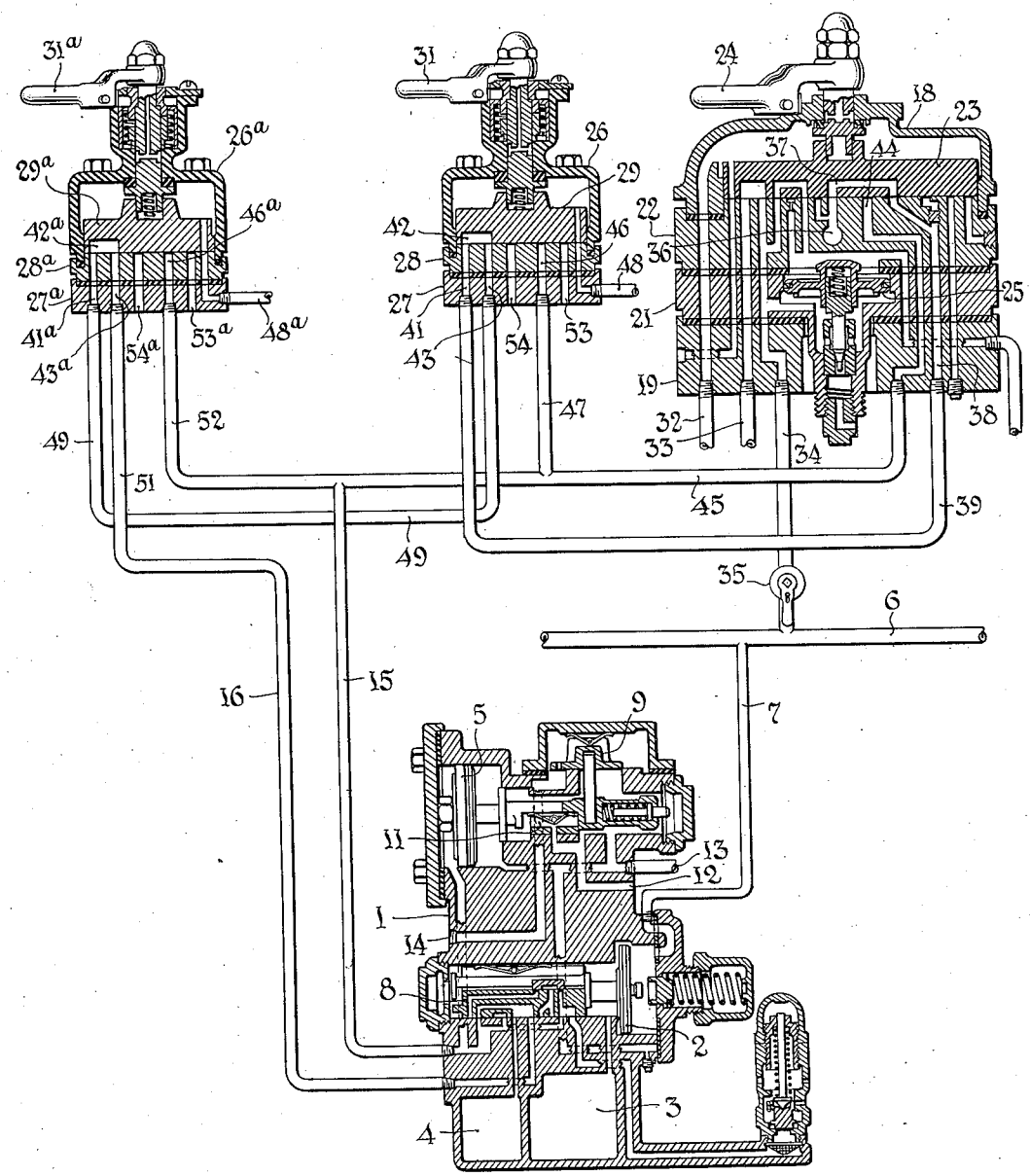
Inventor
Charles A. Campbell
By
Dodge and Sons
Attorneys Patented Sept. 24, 1935

2,015,214

UNITED STATES PATENT OFFICE 2,015,214

AIR BRAKE

Charles A. Campbell, Watertown, N. Y., assignor to The New York Air Brake Company, a corporation of New Jersey Application October 8, 1931, Serial No. 567,699

3 Claims. (Cl. 303—13)

This invention relates to air brakes, and particularly to the engineer's brake valve equipment of the type employing an engineer's brake valve of the automatic type, and an independent brake valve, the latter used to exercise independent control of the so-called ET equipment.

The distributing valve characteristic of the ET equipment is used on locomotives to take the place of triple valves, otherwise required on the locomotive and tender, and includes an equalizing portion which responds to brake pipe pressure, and an application portion which is actuated by pressure established in a chamber by the equalizing portion. The application portion functions to maintain in the brake cylinder a pressure corresponding to the pressure in such chamber.

The distributing valve is normally controlled by the engineer's brake valve through the brake pipe, but the application portion is susceptible of direct control by the independent brake valve which is connected thereto by two pipes, one known as the application cylinder pipe through which air is admitted to the application cylinder in making independent brake applications, and the other known as the distributing valve release pipe through which air is exhausted to release the brakes.

In switching service, the independent brake valve is ordinarily used, for the reason that in switching the engineer commonly needs merely the locomotive and tender brakes. While backing the engineer must look to the rear, and it is then very difficult for him to reach the independent brake valve.

The chief purpose of the present invention is to provide a second independent brake valve which may be located in a favorable position for manipulation while looking to the rear. The invention resides primarily in the piping arrangement which permits either of two independent brake valves to be used in making and releasing an application, provided the other be left in running position.

Generally stated this piping arrangement is such that when both independent brake valves are in running position, the release pipe is connected to exhaust through the two independent brake valves in series. If either brake valve be moved from running position, this exhaust is cut off. When either valve is moved to application position it functions to admit air under pressure to the application portion. This result is secured because the two independent brake valves are connected to the application cylinder pipe in parallel with each other.

It follows from the above arrangement that when both valves are in running position, the release pipe is open to exhaust. If either valve is moved to application position, this exhaust is interrupted at that valve and a supply connection to the application cylinder pipe is established through that valve. The arrangement is particularly useful because two identical independent brake valves may be used, the first of which is connected to the engineer's (automatic) brake valve in the usual manner, and the second of which has merely the series parallel connection with the first above specified. This produces a very simple construction. No special equipment is required other than the series-parallel pipe connections.

The preferred embodiment of the invention is illustrated in the accompanying drawing which shows, in diagrammatic section, an engineer's brake valve of the automatic type, two independent brake valves, and a distributing valve of the 6—E type connected according to the present invention.

The distributing valve mechanism of the 6—E type is indicated generally by the numeral 1. This conforms to known construction and consequently does not require any detailed description. The piston of the equalizing portion is indicated at 2, the pressure chamber forming part of the equalizing portion at 3, the application chamber at 4, and the piston of the application portion at 5.

The brake pipe appears at 6, and 7 is a branch pipe leading to the equalizing portion of the distributing valve 1. The connections are such that the piston 2 is balanced between brake pipe pressure and pressure in the chamber 3. The piston 2 actuates a slide valve 8 which controls the admission and exhaust of pressure against the left side of piston 5. The piston 5 operates two slide valves, the first indicated at 9, which controls the flow of air from the main reservoir to the brake cylinder, and the second an exhaust valve 11 which controls the exhaust of air from the brake cylinder through the atmospheric exhaust port 12. The brake cylinders (not shown) are connected to the valve 1 by the pipe 13 and the main reservoir is connected at 14. In addition there is an application cylinder pipe 15 connected to the space to the left of piston 5, and a release pipe 16 used to control the release of the brakes through the independent brake valve.

The mechanism so far described differs in no particular from standard equipment.

The engineer's brake valve is indicated generally by the numeral 18 applied to its cap, as is illustrated as of the well-known H—6 type, though various suitable automatic (equalizing discharge) brake valves might be substituted. The view is diagrammatic and shows the valve in running position.

The valve is made up as usual of a pipe bracket portion 19, an equalizing discharge portion 21, a rotary valve seat portion 22, the cap 18, and a rotary valve 23. The rotary valve is turned through the usual stem by means of handle 24. The equalizing discharge piston is indicated at 25.

It has been usual to associate with the automatic engineer's brake valve 18, an independent brake valve, indicated by the numeral 26 applied to its cap. This is indicated as of the well known S—6 type. The valve, as usual, includes a pipe bracket portion 27, a rotary valve seat portion 28 and a rotary valve 29 enclosed within the cap 26. The valve 29 is turned through the usual stem by means of a handle 31, and is shown diagrammatically in running position.

The main reservoir connection to the engineer's brake valve is shown at 32, while 33 is the feed valve connection and 34 is a branch pipe leading from the engineer's brake valve to the brake pipe 6. The usual double-heading cock 35 is interposed in this branch.

In running position, as shown, the exhaust port 36 in the engineer's brake valve is connected by the loop cavity 37 with passage 38, and the passage 38 is connected to a pipe 39 which leads to a passage 41 in the independent brake valve 26. In running position of the independent brake valve this passage is connected by cavity 42 with a passage 43. In the conventional installations the passage 43 is connected directly to the release pipe 16, but according to the present invention, this connection is further controlled by a second independent brake valve, as will be described.

There is a passage 44 in the engineer's brake valve 18. In the emergency position of the engineer's brake valve a port (not visible in the drawing) through the rotary valve 23 registers with and admits main reservoir air to the passage 44. The passage 44 is connected by a pipe 45 with the application cylinder pipe 15. Similarly there is a port 46 in the seat of the rotary valve 29 which is connected by a pipe 47 with the application cylinder pipe. There are ports through the rotary valve 29 (such ports not being visible in the drawing but being a characteristic part of independent brake valves in common use) which admit air from the space above the rotary valve 29 to the port 46 at a relatively slow rate in slow application position, and at a more rapid rate in quick application position.

The air for this purpose is supplied to the space above the rotary valve 29 through a pipe 48 which is supplied from the main reservoir through the usual reducing valve.

The second independent brake valve is identical with the first, and similar parts are identified by similar numerals with the subscript *a*.

According to the present invention, the port 43 instead of being connected with the release pipe 16 directly, is connected by the pipe 49 with the passage 41a in the second independent brake valve. When this valve is in running position the cavity 42a connects the ports 41a with the port 43a which is connected by the pipe 51 with the release pipe 16. The port 46a is connected by a branch 52 with the application cylinder pipe 15. The pipe 48a receives air from the same reducing valve as does the pipe 48, though so far as the invention is concerned, it is immaterial what the source of air is so long as it is supplied at a suitable pressure.

Ports 53 and 54 in the independent valve 26, and the corresponding ports 53a and 54a in the second valve 26a are atmospheric exhaust ports.

It will be observed, therefore, that the passages 10 44, 45 and 46a are connected to the application cylinder pipe in parallel. Since the exhaust flow from the release pipe 16 must occur through all three valves in series, it can only occur when all three valves are in running position. This exhaust flow is through the pipe 16, through the port 43a, recess 42a, port 41a, pipe 49, port 43, recess 42, port 41, pipe 39, port 38, loop port 37 to the exhaust port 36. If any one of the three valves is moved away from running position, the exhaust flow is interrupted. Such motion is a necessary incident to motion of any valve to an application position. Consequently, the first effect of motion toward an application position is to close the release pipe. If either one of the independent valves 26 or 26a is moved to slow application position or quick application position, it will, independently of the other, admit air to the application cylinder pipe 15. The automatic valve 18 also acts to admit air to this pipe in emergency position, but only in emergency position.

While it is contemplated that not more than two independent brake valves will be required, it is obvious that an additional valve or valves might be used provided the series-parallel connections already described were extended to include such additional valve or valves.

While I have illustrated the invention as embodied by the use of standard brake valves and distributing valves, it will be understood that the invention is not limited to these specific details, but may be variously applied. The ability to avail of commercial equipment without change, is an important feature from the standpoint of railroad operation, and I have illustrated standard apparatus to make clear the full possibilities of the invention without any intent to limit the scope of the invention in that regard.

What is claimed is,—

1. The combination of a distributing valve, having a release connection and an application connection; a plurality of brake valves of the independent type, each serving in running position to connect two release passages for exhaust flow, and serving in application position to supply air under pressure to an application passage; means connecting said application passages of the various independent valves in parallel with each other to said application connection; and means connecting said release connection of the distributing valve through said release passages of the various independent valves in series.

2. The combination of a brake pipe; a distributing valve connected thereto for control by the pressure therein, said distributing valve having a release connection and an application connection; an engineer's brake valve arranged to control pressure in said brake pipe, and serving in running position to connect a release port with atmosphere and in emergency position to supply air to an application port; a plurality of independent brake valves, each serving in running position to connect two release passages, and each serving in an application position to supply air under pressure to an application port; means connecting the application connection of the distributing valve with the application ports of the engineer's brake valve and independent brake valves in parallel with each other; and means connecting the release connection of the distributing valve through the release passages of the independent brake valves in series to the release port of the engineer's brake valve.

3. The combination of a brake pipe; a distributing valve connected thereto for control by the pressure therein, said distributing valve having a release connection and an application connection; an engineer's brake valve arranged to control pressure in said brake pipe, and serving in running position to connect a release port with atmosphere; a plurality of independent brake valves, each serving in running position to connect two release passages, and each serving in an application position to supply air under pressure to an application port; means connecting the application connection of the distributing valve with the application ports of the independent brake valves in parallel with each other; and means connecting the release connection of the distributing valve through the release passages of the independent brake valves in series to the release port of the engineer's brake valve.

CHARLES A. CAMPBELL.